March 30, 1943.   R. BOWERMAN   2,315,393
CHUCK HANDLING DEVICE FOR LATHES
Filed Nov. 8, 1940

Inventor
Ray Bowerman
By Fred Gerlach
his Atty

Patented Mar. 30, 1943

2,315,393

UNITED STATES PATENT OFFICE 2,315,393

CHUCK HANDLING DEVICE FOR LATHES

Ray Bowerman, Niles, Mich.

Application November 8, 1940, Serial No. 364,759

7 Claims. (Cl. 82—34)

The invention relates to lathes and more particularly to devices or attachments for supporting and transporting a plurality of chucks for connection with, and disconnection from, the drive-shaft of the lathe.

In the use of lathes it is frequently necessary to change the chucks on the drive-shaft. For example, when one side or face of a piece of work or blank is to be machined, a four-jawed chuck is used to support the work during the machining of the portions of the blank accessible to the machining tool or cutter. After this has been done it is necessary to reverse the position of the work for machining the remainder of the work and a three-jaw chuck is preferably used for gripping the work during the remainder of the machining. In other instances, it is desirable to alternately use chucks of different sizes. In many instances the chucks are of considerable weight so they are difficult to handle in removal from the drive-shaft and replacement thereon.

One object of the invention is to provide a structure or crane for supporting and transporting a plurality of chucks while they are being coupled to, and uncoupled from, the drive-shaft of the lathe and to support one of them in convenient position for an interchange of chucks.

Another object of the invention is to provide a structure which is provided with means for connection to the chucks to hold them against rotation for effecting their coupling to, and uncoupling from, the lathe-shaft, by the rotation of the shaft by power.

Other objects of the invention will appear from the detailed description.

The invention consists in the several novel features which are hereinafter set forth and are more particularly defined by claims at the conclusion hereof.

Figure 1:
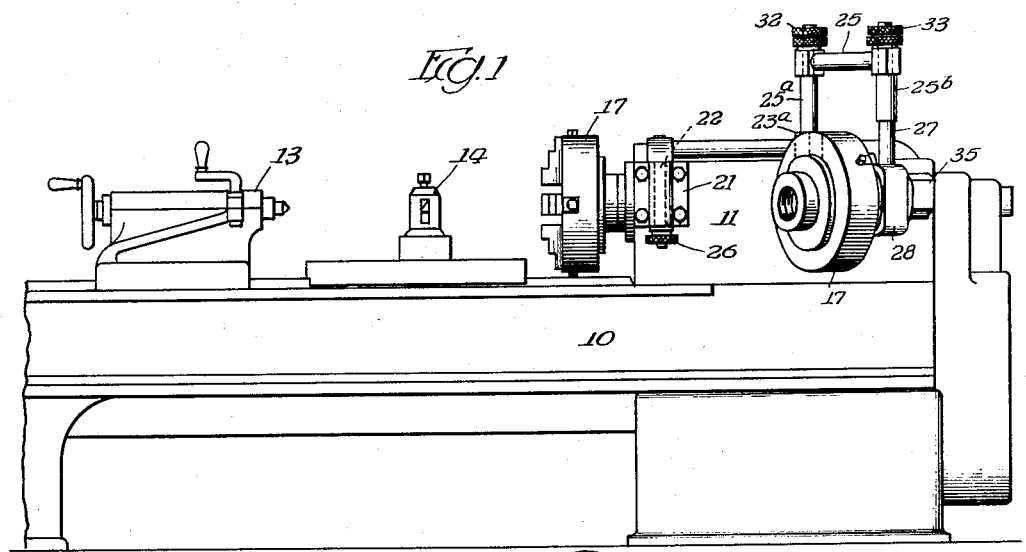
Figure 2:
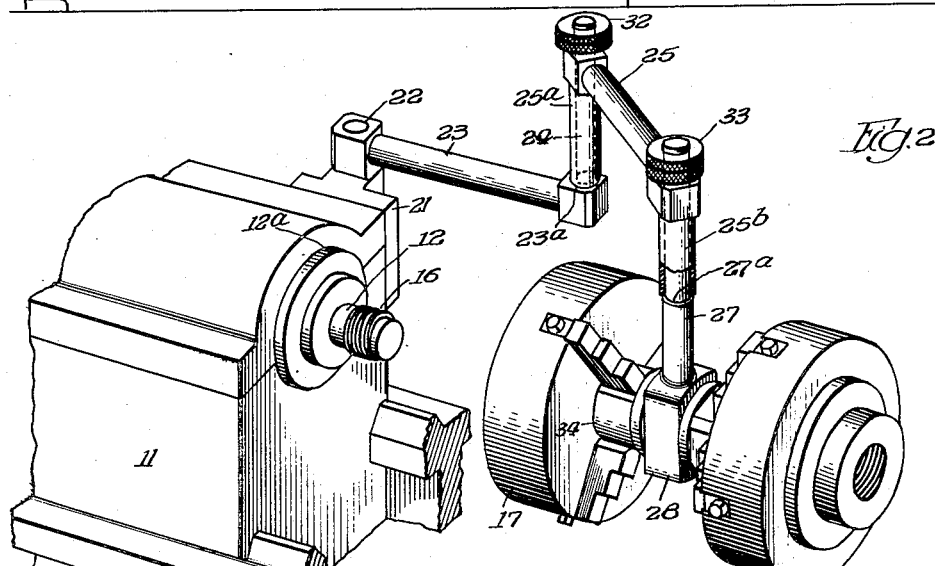
Figure 3:
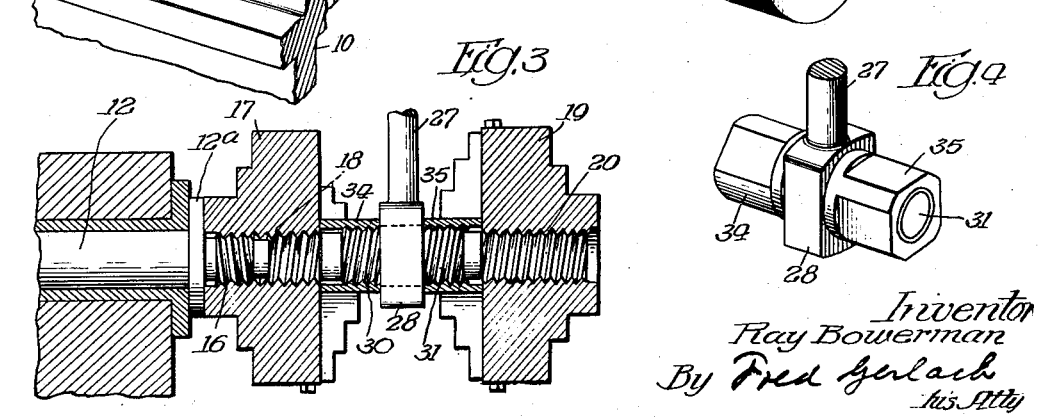
Figure 4:
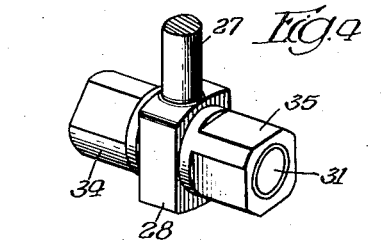

In the drawing: Fig. 1 is a side elevation of a lathe embodying the invention. Fig. 2 is a perspective illustrating a pair of chucks on the supporting and transporting structure and separated from the drive-shaft. Fig. 3 is a longitudinal section illustrating a pair of chucks connected to the supporting structure, one of them being connected to the drive-shaft. Fig. 4 is a perspective of the collars on the hanger which are adapted to be engaged by the jaws of the chucks respectively.

The invention is exemplified as applied to a lathe, which may be of any usual construction and comprises a frame 10 with a housing 11, a drive-shaft 12 for the chuck journaled in housing 11 and provided with a flange 12ª, a tail-stock 13, a tool-support 14, and suitable gearing for driving the shaft 12 in opposite directions, usually from an electric motor or other source of power. The drive-shaft 12 projects from the housing 11 and its projecting end is provided with a screw-thread 16, for removably connecting the chucks to the shaft. A three-jaw chuck 17 has a central screw-threaded bore 18 extending therethrough and adapted to engage the screw-thread 16 on the drive-shaft by rotation of the shaft 12 in one direction while the chuck is held against rotation. A four-jaw chuck 19 is provided with a similar screw-threaded bore 20 for connection with the screw-thread 16 on the drive-shaft. These chucks may be of any suitable type and construction, as well understood in the art.

The invention comprises a supporting and transporting structure adapted to carry the pair of chucks for alternate connection to, and removal from, the drive-shaft 12. This structure is supported from the frame of the lathe by a bracket 21 which may be fixed to the housing 11 on the side opposite to that at which the tool-support 14 is placed. This structure comprises a suitable vertical spindle 22 journaled in the bracket 21; an arm or link 23 rigidly connected to the upper end of spindle 22 and seated on the upper end of bracket 21; an upstanding spindle 24 rigid with the distal end of arm 23 and a shoulder 23a on said arm; a second arm 25 provided with a bearing-sleeve 25ª which is journaled on spindle 24 and seated on shoulder 23ª of arm 23; a bearing-sleeve 25ᵇ depending from, and rigid with, the outer end of arm 25; a hanger-spindle 27 journaled in sleeve 25ᵇ of arm 25 and provided at its lower end with a supporting member or hanger 28; and a pair of screw-threaded studs 30, 31 rigid with, and projecting from, the opposite sides of hanger 28. A nut 26 is threaded to the lower end of the spindle 22 to removably retain said spindle in bracket 21 and may also be tightened to frictionally hold spindle 22 and arm 23 against horizontal pivotal movement. A nut 32 is threaded to the upper end of spindle 24 to hold arm 21 and its sleeve 25ᵇ on spindle 24 and may, when desired, be tightened to frictionally hold arm 25 against pivotal movement relatively to arm 23. A nut 33 threaded to the upper end of spindle 27 is adapted to engage the upper face of the outer end of arm 25 to support spindle 27 in sleeve 25ᵇ and is also adapted, when tightened, to frictionally hold sleeve 25ᵇ against a shoulder 27ª on shaft 27 to frictionally hold spindle 27 and hanger 28 against rotation in arm 25. These nuts 26, 32 and 33, when tightened, serve to hold the structure against accidental swinging when the chuck or chucks carried thereby are not in use, and when it is desired to support the chucks away from the shaft 12. This exemplifies a structure for supporting the hanger so it can be moved horizontally to any position between the prolongation of the axis of the shaft 12 and a space at one side of the frame which is not used during the operation of the lathe, as illustrated in Fig. 1. The pivotal movement of the arms 23, 25 may be compounded to move the studs 30, 31 axially into alignment with the axis of the shaft 12 for connecting a chuck and removing it from the screw-thread 16 of shaft 12. The pivotal movement of hanger 28 in arm 25 permits the chuck or collar at either side of the hanger to be brought into facing relation with the end of shaft 12. A collar 34 having its periphery shaped so it can be gripped by the three-jaw clutch 17, is screw-threaded to the stud 30. The inner end of collar 34 seats against one side of the hanger 28. A collar 35 has its periphery shaped to be gripped by the four-jaw clutch 19, is screw-threaded to stud 31, and its inner end is adapted to seat against the opposite side of hanger 28. The screw-threads on studs 30 and 31 and collars 34 and 35 are of the opposite trend to the thread 16 on shaft 12 and the female threads 18, 20 in chucks 17 and 19, respectively. When a chuck is to be uncoupled from shaft 12 and one of the collars 30, 31 has been gripped by the chuck-jaws, shaft 12 will be rotated by power in a reverse direction from that in which it is rotated during the machining operation. The screw-thread 16 will then be rotated out of the thread in the chuck. The rotation of the chuck will then be prevented because the chuck will tend to rotate the collar which is gripped thereby onto the screw on the stud and against its seat on the hanger 28. This is desirable because of the force required to release the chuck from the screw-thread 16. When the chuck is to be coupled to shaft 12 the latter is rotated in the working direction and the screw 16 rotates easily into the thread in the chuck until the chuck seats against flange 12ª on shaft 12. When the chuck is seated on flange 12ª the shaft will be stopped.

The operation will be as follows: assuming the chuck 17 to be coupled to shaft 12, as illustrated in Fig. 3, and the machining operation to be performed with that chuck has been completed, the chuck 19 will be carried by the supporting structure in any position where it does not interfere with the operation of the lathe and will be available for interchange with chuck 17. When it is desired to uncouple chuck 17 from shaft 12 and to couple chuck 19 to said shaft, the hanger 28 will be shifted horizontally from its out-of-the-way position until the collar 34 is axially aligned with the shaft 12 and then shifted axially into position to be gripped by the jaws of chuck 17. The jaws will then be tightened to grasp the collar 34 so that the chuck 17 will be supported from the hanger as it is uncoupled from shaft 12. Shaft 12 will then be rotated in reverse direction which will cause the screw 16 on the shaft to rotate out of the thread 18 in chuck 17 until the chuck 17 is completely disconnected from said screw and supported from the hanger. The collar 34 on stud 30 will then be seated against one side of hanger 28 to prevent rotation of the chuck 17 with screw 16 and shaft 12 during the uncoupling operation. The chuck 17 will then be supported by the hanger. Hanger 28 will then be turned horizontally in arm 25 to bring the chuck 19 into axial alignment with screw 16 and shaft 12 and so that the screw-threaded bore 20 of chuck 19 will be in position to be engaged by screw-thread 16 on shaft 12. Shaft 12 will then be rotated in the direction in which it is rotated for machining, which will cause screw 16 to draw the chuck 19 against the shoulder 12ª on shaft 12 and couple said chuck to the shaft. The rotation of the shaft 12 is stopped as soon as it is seated against flange 12ª. The jaws of chuck 19 will then be shifted to release the collar 35 for withdrawal axially from the jaws of said chuck. The supporting structure with the chuck 17 carried thereby will then be swung in an out-of-the-way position and the chuck 19 will be rotatable for a machining operation. When the chuck 19 is to be again replaced by chuck 17 the supporting structure will be similarly operated to uncouple chuck 19 from, and couple chuck 17 to, shaft 12.

The invention exemplifies a supporting structure for a plurality of chucks whereby they may be supported for alternately coupling and uncoupling them from the drive-shaft and whereby the uncoupled chuck can be quickly and easily swung into an out-of-the-way position in readiness. The crane relieves the operator of the necessity of lifting the chucks into and out of place and maintains the chuck not in use in a readily available position at all times to greatly facilitate the uncoupling and coupling of the chucks and the shaft 12. The supporting structure may be detached from the lathe by removing spindle 22 from bracket 21. Collars 34, 35 are removable from studs 30, 31 for interchange with collars of different shapes for different chucks. The several parts of the jointed supporting structure may be held against relative movement, to hold the hanger in any desired position, by tightening the nuts 26, 32 and 33, respectively.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A supporting and transporting structure for lathe-chucks comprising a supporting-member provided with means on its sides for engaging and supporting a plurality of chucks, and means for supporting said member from the lathe-frame for bodily horizontal movement in any direction to, and from, the shaft for driving the chuck, comprising an arm pivoted to the lathe-frame for horizontal movement, a second arm connected to the distal end of the other arm for horizontal movement, and a pivotal connection between said member and the distal end of the second arm for permitting horizontal swinging movement of the member, for coupling or uncoupling any of the chucks and said shaft.

2. A supporting and transporting structure for lathe-chucks comprising a supporting-member provided with means on its sides for engaging and supporting a plurality of chucks, said means being non-rotatably held on said member and adapted to be gripped respectively by the jaws of the chucks, and means for supporting said member from the lathe-frame for bodily horizontal movement in any direction to, and from, the shaft for driving the chuck, comprising an arm pivoted to the lathe-frame for horizontal movement, a second arm connected to the distal end of the other arm for horizontal movement, and a pivotal connection between said member and the distal end of the second arm for permitting horizontal swinging movement of the member for coupling or uncoupling any of the chucks and said shaft.

3. A supporting and transporting structure for lathe-chucks comprising a supporting-hanger provided with means on its sides for engaging and supporting a plurality of chucks, and means for supporting said hanger from the lathe-frame for bodily horizontal movement in any direction to, and from, the shaft for driving the chuck, comprising an arm pivoted to the lathe-frame for horizontal movement, a second arm connected to the distal end of the other arm for horizontal movement, and a pivotal connection between said hanger and the distal end of the second arm for permitting horizontal swinging movement of the hanger in the second arm, for coupling or uncoupling any of the chucks and the shaft.

4. A supporting and transporting structure for lathe-chucks comprising a supporting-hanger provided with removable collars on its sides for engaging and supporting a plurality of chucks, said collars being non-rotatably held on said member and adapted to be gripped respectively by the jaws of the chucks, and means for supporting said hanger from the lathe-frame for bodily horizontal movement in any direction to, and from, the shaft for driving the chuck, comprising an arm pivoted to the lathe-frame for horizontal movement, a second arm connected to the distal end of the other arm for horizontal movement, and a pivotal connection between said hanger and the distal end of the second arm for permitting horizontal swinging movement of the hanger, for coupling or uncoupling any of the chucks from said shaft.

5. A supporting and transporting structure for lathe-chucks provided with a screw-threaded bore for connection to a screw-thread on the drive-shaft of the lathe and with jaws for clamping the work, comprising a suspension member, collars on the sides of said member provided with polygonal faces adapted to be engaged by the jaws to lock the chucks against rotation while the shaft is driven to rotate the screw-thread into or out of the screw-threads in the chucks, and pivotally connected members for supporting said suspension member for free rectilinear movement of the collars and chucks coaxially with the shaft during the connection and disconnection of the threads on the shaft and the chucks, and for horizontal movement away from the shaft after disconnection of the chuck and into coaxial relation with the shaft for connection of the chuck to the shaft.

6. A supporting and transporting structure for lathe-chucks provided with a screw-threaded bore for connection to a screw-thread on the drive-shaft of the lathe and with jaws for clamping the work, comprising a suspension member, collars on the sides of said member provided with polygonal faces adapted to be engaged by the jaws of chucks having different numbers of jaws, respectively, to lock the chucks against rotation while the shaft is driven to rotate the screw-thread into and out of the screw-threads in the chucks, and pivotally connected members for supporting said suspension member for free rectilinear movement of the collars and chucks coaxially with the shaft during the connection and disconnection of the threads on the shaft and the chucks, and for horizontal movement away from the shaft after disconnection of the chuck and into coaxial relation with the shaft for connecting the chuck to the shaft.

7. A supporting and transporting structure for lathe-chucks provided with a screw-threaded bore for connection to a screw-thread on the drive-shaft of the lathe and with jaws for clamping the work, comprising a suspension member, screw-studs on the sides of said member, collars on and screw-threaded to said studs, provided with polygonal faces adapted to be engaged by the jaws which lock the chucks against rotation while the shaft is driven to rotate the screw-thread into and out of the screw-threads in the chucks, and pivotally connected members for supporting said suspension member for free rectilinear movement of the collars and chucks coaxially with the shaft during the connection and disconnection of the thread on the shaft and the chucks, and for horizontal movement away from the shaft after disconnection of the chuck and into coaxial relation with the shaft for connecting the chuck to the shaft.

RAY BOWERMAN.